United States Patent
Ban et al.

(10) Patent No.: US 7,161,321 B2
(45) Date of Patent: Jan. 9, 2007

(54) MEASURING SYSTEM

(75) Inventors: Kazunori Ban, Minamitsuru-gun (JP); Makoto Yamada, Minamitsuru-gun (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/100,486

(22) Filed: Apr. 7, 2005

(65) Prior Publication Data

US 2005/0225278 A1 Oct. 13, 2005

(30) Foreign Application Priority Data

Apr. 7, 2004 (JP) .............................. 2004-113451

(51) Int. Cl.
*B25J 9/16* (2006.01)
(52) U.S. Cl. .............. 318/568.1; 318/567; 318/568.12; 318/568.11; 318/568.7; 318/568.4
(58) Field of Classification Search ............ 318/568.1, 318/567, 568.12, 568.11, 568.17, 568.21, 318/569, 572; 361/600; 347/238
See application file for complete search history.

(56) References Cited

U.S. PATENT DOCUMENTS

| | | | |
|---|---|---|---|
| 4,700,118 A | 10/1987 | Kishi et al. | |
| 2004/0135876 A1* | 7/2004 | Ueda et al. | 347/238 |
| 2005/0036274 A1* | 2/2005 | Suhara et al. | 361/600 |

FOREIGN PATENT DOCUMENTS

| | | |
|---|---|---|
| DE | 40 15 644 A1 | 11/1991 |
| EP | 0 358 765 A1 | 3/1990 |
| EP | 0 417 320 A1 | 3/1991 |
| WO | 03/059580 A2 | 7/2003 |

* cited by examiner

*Primary Examiner*—Karen Masih
(74) *Attorney, Agent, or Firm*—Drinker Biddle & Reath LLP (57) ABSTRACT

The image of a tool center point (31) caught by a camera (light-receiving device) 4 from two initial positions is moved to a predetermined point, by a predetermined point moving process, at the center of a light-receiving surface thereby to acquire robot positions (Qf1, Qf2), based on which the direction of the view line (40) is determined. Next, the robot is moved to the position where the position (Qf1) is rotated by 180 degrees around the Z axis of a coordinate system (Σv1) thereby to execute the predetermined point moving process. After rotational movement, a robot position (Qf3) is acquired. The midpoint between the position (Qf1) and the position (Qf3) is determined as the origin of a coordinate system (Σv2). Using the position and the posture of the view line (40), the position of the tool center point (31) is determined. Thus, the position of the tool center point with respect to the tool mounting surface can be determined using a fixed light-receiving device. By additionally measuring two points at known relative positions from the tool center point, the tool posture as well as the position of the tool center point can be determined.

10 Claims, 10 Drawing Sheets

POINT ON Z AXIS (CENTER OF LARGE WHITE CIRCLE)

ORIGIN (TOOL CENTER POINT) (CENTER OF SMALL BLACK CIRCLE)

POINT ON X AXIS (CENTER OF SMALL WHITE CIRCLE)

MEASURING SYSTEM

BACKGROUND OF THE INVENTION

1. Field of the Invention

The present invention relates to a measuring system for measuring the position of a tool center point (TCP) with respect to the tool mounting surface of a tool mounted at the forward end of an arm of a robot or, in particular, to a measuring system for measuring the position of the tool center point with respect to the tool mounting surface by combining the robot with a light receiving device such as a camera or a PSD (position sensing detector).

2. Description of the Related Art

Figure 1:
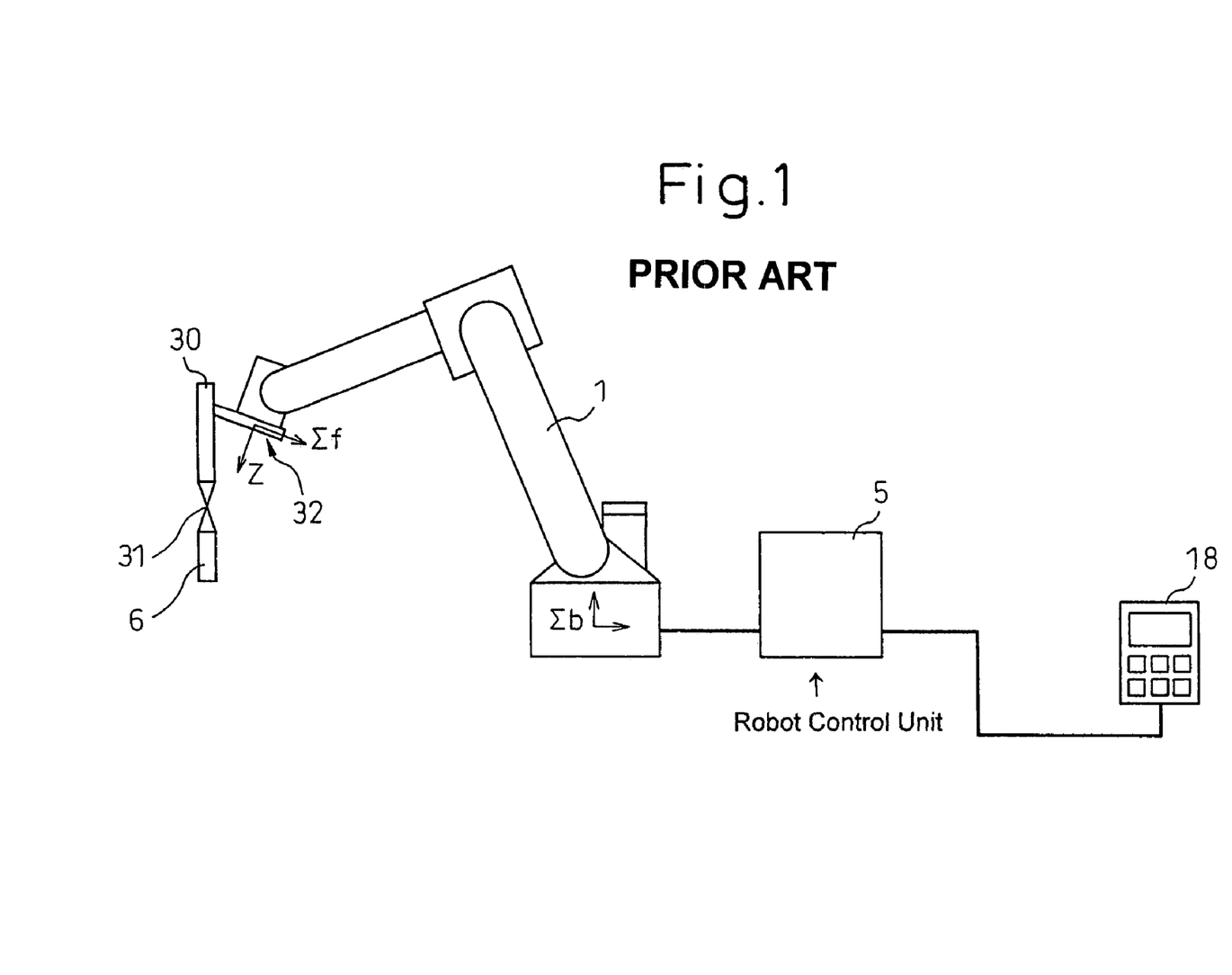
FIG. 1 is a diagram showing a typical arrangement to determine the tool center point according to the prior art (touch-up method).

A method to measure the position of the tool center point with respect to the tool mounting surface of a robot using the three-point touch-up or the six-point touch-up capability is known. FIG. 1 shows a typical arrangement used for application of this method. As shown in FIG. 1, the robot 1 is connected to a robot control unit 5 for controlling the robot 1, and a tool 30 is mounted at the forward end of the arm of the robot 1. The robot 1 has set therein a coordinate system (hereinafter referred to as a robot coordinate system) $\Sigma b$ fixed on the robot base and a coordinate system (hereinafter referred to as a mechanical interface coordinate system) $\Sigma f$ fixed on the tool mounting surface 32. In the robot control unit 5, the position and the posture (current position) of the origin of the mechanical interface coordinate system can be determined at any time. Also, a well-known teaching operation panel 18 having manual operation keys is connected to the robot control unit 5, so that the operator can manipulate the robot 1 by operating the manual operation keys.

When determining the position of the forward end point 31 (tool center point) of the tool 30 by a touch-up method, a touch-up pin 6 having a sharp tip, for example, is prepared and fixed at a position within a range reachable by the center point of the tool 30 of the robot in operation. As a result, the tip of the touch-up pin 6 corresponds to one point fixed in space. By operating the manual operation keys of the teaching operation panel 18, for example, the tool center point 31 is touched to the touch-up pin 6 at different postures (for example, three or six postures) while jogging and, based on the robot position (position and posture of the mechanical interface coordinate system) at the time of each touch-up operation, the position of the tool center point 31 with respect to the tool mounting surface (represented by the mechanical interface coordinate system) 32 of the robot 1 is determined.

This method, however, poses the following problems:

(1) As described above, at the time of the touch-up operation, the robot is jogged while the tool center point of the robot is aligned to coincide with the forward end of the touch-up pin. In the process, the accuracy of the position of the tool center point finally determined is liable to be varied depending on the degree of skill of the operator with regard to positioning the robot.

(2) Also, this positioning operation is performed visually, and therefore even a skilled operator can produce only a limited accuracy.

(3) Further, in view of the fact that the tool center point is set in extreme proximity to the forward end of the touch-up pin, the tool center point is liable to contact the forward end of the touch-up pin and damage the tool or the touch-up pin.

Under the circumstances, there exists no publications describing a technique capable of solving these problems by a simplified method.

Accordingly, it is an object of this invention to solve the problems of the prior art, and to provide a measuring system whereby the position of the tool center point with respect to the tool mounting surface can be determined with high accuracy without using the touch-up pin.

SUMMARY OF THE INVENTION

The invention is based on the concept that the light from the tool center point is caught by the light-receiving surface of a light-receiving device (typically, a camera or a PSD) arranged in the neighborhood of the robot, and the robot is moved in such a manner that the light is focused at a predetermined point (for example, at the center of the camera image or PSD origin) thereby to obtain the robot position. With this function as a base, the tool is moved in various postures and in combination with the robot movement, the position of the tool center point with respect to the tool mounting surface of the robot can be measured.

More specifically, according to a first aspect of the invention, there is provided a measuring system comprising a robot with a tool mounted at the forward end of an arm thereof and a light-receiving device, a means for setting the robot in the initial position, a means for catching, by the light-receiving device, the center point of the tool mounted at the forward end of the robot arm and determining the position, on the light-receiving surface of the light-receiving device, of the tool center point with the image thereof focused on the light-receiving surface, a means for determining the movement to be covered by the robot in such a manner as to move the position of the tool center point on the light-receiving surface to a predetermined point on the light-receiving surface, a means for moving the robot by the movement to be covered, a means for acquiring and storing the position of the robot after movement, and a means for determining, in the presence of a plurality of initial positions, the position of the tool center point with respect to the tool mounting surface of the robot using the robot position stored by moving the robot for each initial position.

The measuring system may comprise a coincidence determining means for determining, before acquiring and storing the robot position after movement, that the position of the tool center point with the image thereof focused on the light-receiving surface of the light-receiving device coincides with a predetermined point on the light-receiving surface (second aspect). In this case, the position of the tool center point with the image thereof focused on the light-receiving surface of the light-receiving device can be positively rendered to coincide with the predetermined point on the light-receiving surface.

Also, the measuring system may further comprise a means for setting the position of the robot as the initial position again in the case where the coincidence determining means fails to determine the coincidence within the predetermined error, (third aspect). In this case, by repeating the movement of the robot, the position of the tool center point with the image thereof focused on the light-receiving surface of the light-receiving device can be more positively made to coincide with the predetermined point on the light-receiving surface.

According to a fourth aspect of the invention, there is provided a means for determining the direction of the view line of the light-receiving device with respect to the robot coordinate system using at least two positions of the robot, the positions having the same tool posture and different distances between the tool and the light-receiving device each other. As a result, a specific configuration is provided to determine the direction of the view line of the light-receiving device against the robot.

Based on the direction of the view line of the light-receiving device determined above with respect to the robot coordinate system, a means is provided to determine the position of the view line of the light-receiving device with respect to the robot coordinate system using at least two positions of the robot with different tool postures including the rotation around the axis parallel to the direction of the view line (fifth aspect). In this case, a specific configuration is provided to determine the position of the view line of the light-receiving device against the robot.

Further, based on the position and direction of the view line of the light-receiving device determined above with respect to the robot coordinate system, a means is provided to determine the position of the tool center point with respect to the tool mounting surface of the robot using at least two positions of the robot with different tool postures including the rotation around the axis perpendicular to the direction of the view line (sixth aspect). In this case, a specific configuration is provided to determine the position of the tool center point with respect to the tool mounting surface of the robot.

In any of the aspects of the invention described above, the light-receiving device can be arranged at an arbitrary position in the neighborhood of the robot at the time of measurement, and can be removed after measurement (seventh aspect). The light-receiving device may be configured of a camera (eighth aspect) to capture a two-dimensional image or a PSD (ninth aspect) to determine the center of gravity of the distribution of the received light quantity. According to a tenth aspect of the invention, there is provided a measuring system comprising a means for determining the position and direction of the tool center point with respect to the tool mounting surface of the robot by additionally measuring one or two points on the tool in predetermined positional relation with the tool center point. As a result, a specific configuration is provided to determine the position and posture of the tool center point with respect to the tool mounting surface of the robot.

This invention can eliminate the variations of the position of the tool center point depending on the posture of the robot or the skill of the operator in touching the tool center point to the touch-up pin. Also, the error of the position of the tool center point which otherwise might be caused by visual alignment is eliminated. Further, the noncontact measurement can eliminate an accident by contact which otherwise might be caused in touch-up operation. These advantages make possible a highly accurate, steady and safe measurement.

In addition, the view line of the camera can be determined by a simple method as described above, and therefore, even in the case where the relative positions of the robot and camera are changed into an nonmeasurable state, a measurable state can be easily restored. Specifically, a configuration of a measuring system is made possible in which the camera is arranged only when the measurement is required and removed upon complete measurement (seventh aspect). This indicates that the robot can actually conduct the job using the tool mounted at the forward end of the arm thereof without taking the presence of the camera into consideration.

These and other objects, features and advantages of the present invention will be more apparent in light of the detailed description of exemplary embodiments thereof as illustrated by the drawings.

DETAILED DESCRIPTION

Figure 2:
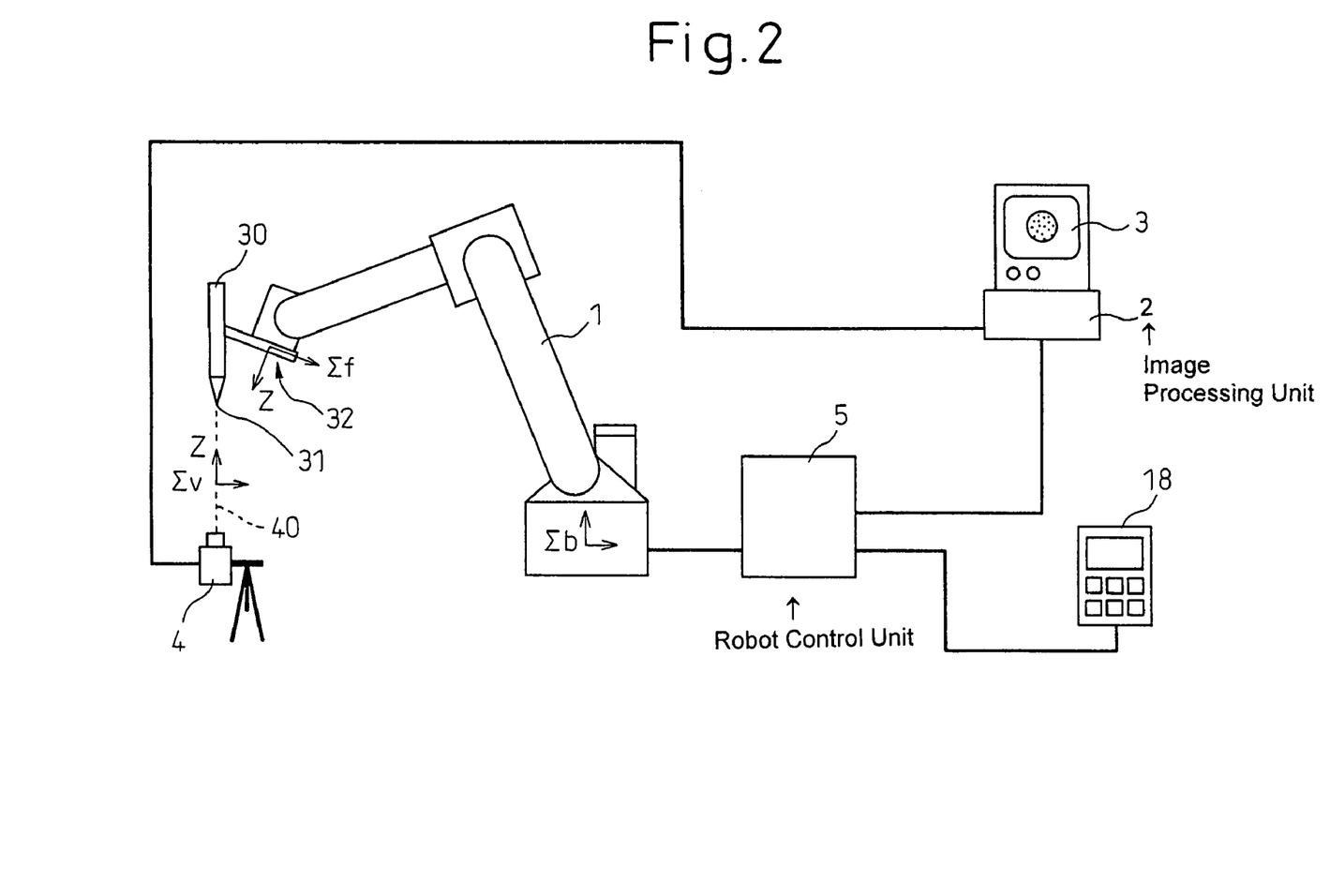
FIG. 2 is a diagram schematically showing a general configuration according to an embodiment of the invention.

Embodiments of the invention are explained below with reference to FIGS. 2 to 10 sequentially. First, FIG. 2 is a schematic diagram showing a general configuration of an embodiment of the invention. As shown in FIG. 2, a robot 1 is connected to a robot control unit 5 for controlling the robot 1, and a tool 30 is mounted at the forward end (tool mounting surface 32) of the arm of the robot 1. A robot coordinate system $\Sigma b$ fixed on the robot base and a mechanical interface coordinate system $\Sigma f$ fixed on the tool mounting surface 32 are set in the robot 1. The position and posture (current position) of the origin of the mechanical interface coordinate system can be known at any time in the robot control unit 5. Also, a well-known teaching operation panel 18 having manual operation keys is connected to the robot control unit 5, and the robot 1 can be manipulated by the operator through the manual operation keys.

Figure 3:
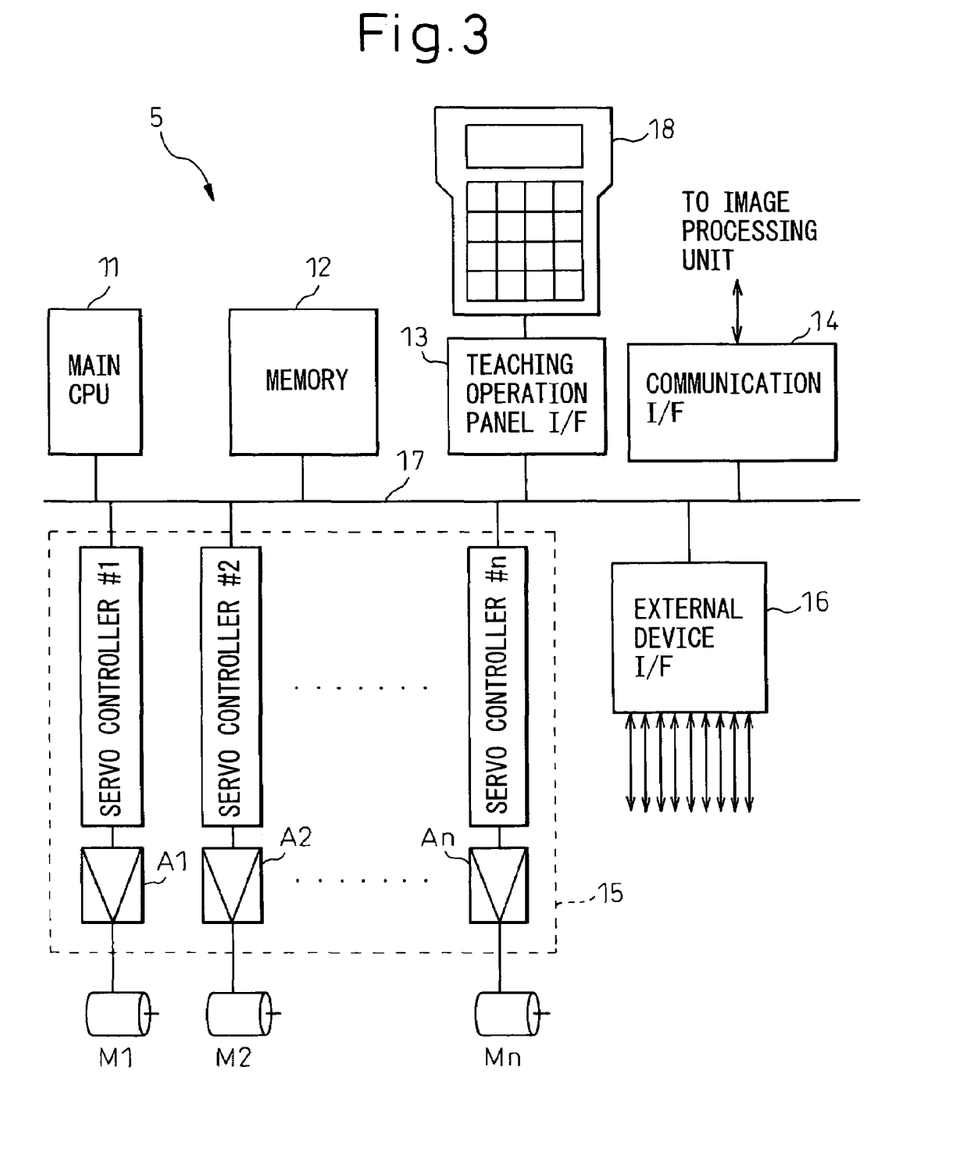
FIG. 3 is a diagram showing a block configuration of a robot control unit according to an embodiment.

The robot 1 is a well-known typical robot, and the robot control unit 5 has a well-known block configuration as shown in FIG. 3. Specifically, a memory 12 such as a RAM, a ROM or a nonvolatile memory, a teaching operation panel interface 13, an external device input/output interface 16, a servo control unit 15 and a communication interface 14 are connected in parallel to each other on a bus 17 connected to a main CPU (hereinafter referred to as the CPU) 11.

The teaching operation panel 18 connected to the teaching operation panel interface 13 has a normal display function. The operator, by manual operation of the teaching operation panel 18, prepares, corrects and registers the robot operation programs, sets various parameters, performs the regenerative operation of the taught operation programs and jogging. The system programs supporting the basic functions of the robot and the robot control unit is stored in the ROM of the memory 12. Also, the robot operation programs (for example, the spot welding program) taught in accordance with an application and related setting data are stored in the nonvolatile memory of the memory 12.

Also, the data including the parameters and the program to execute various processes (processes for robot movement for the determination of TCP and communication with the image processing unit) are also stored in the nonvolatile memory of the memory 12. The RAM of the memory 12 is used as an area to temporarily store the data for various arithmetic operations performed by the main CPU 11. The servo control unit 15 includes servo controllers #1 to #n (n: total number of robot axes, and 6 in the case under consideration), and in response to a movement instruction prepared by the arithmetic operation (forming the tracking plan and the interpolation, inverse transform, etc. based on the tracking plan) for controlling the robot, outputs a torque command to the servo amplifiers A1 to An together with the feedback signal received from a pulse coder (not shown) associated with each axis. In response to each torque command, the servo amplifiers A1 to An each supply the current to the servo motors M1 to Mn of each axis and drive them. The communication interface 14 is connected to the image processing unit 2 (see FIG. 2), and through the communication interface 14, the instructions related to the measurement and the measurement result data described later are exchanged with the robot control unit.

Returning to FIG. 2, a camera 4 is arranged, using a tripod or the like, at a position where the image of the tool center point 31 of the tool 30 can be picked up. The camera 4 is a well-known light-receiving device, for example, CCD camera, having the function of detecting a two-dimensional image on the light-receiving surface (CCD array surface) by the image capturing operation (as described later, the PSD may be used as a light-receiving device). The camera 4 is connected to the image processing unit 2 having a monitor 3 such as a LCD, CRT, etc.

Figure 4:
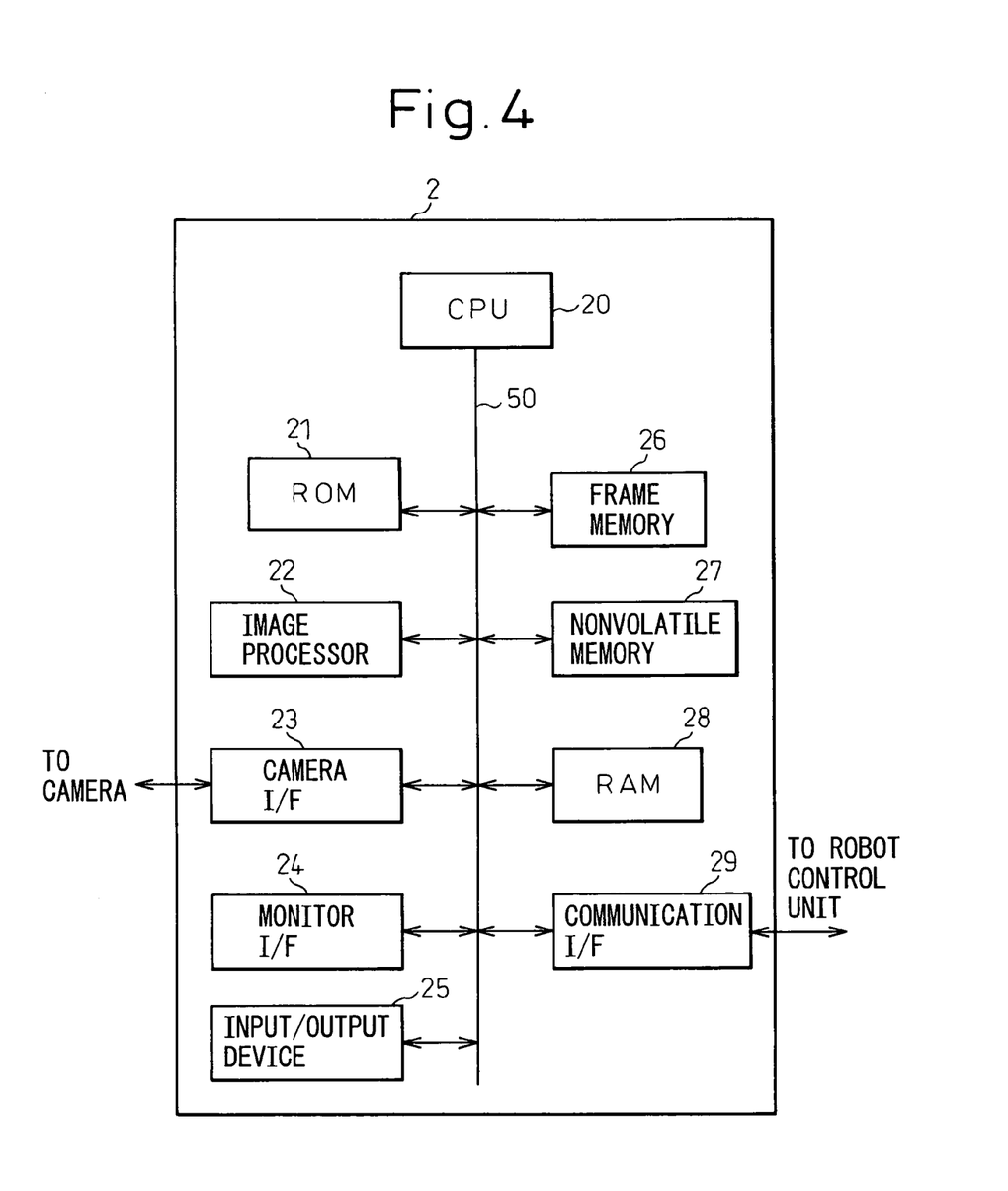
FIG. 4 is a diagram showing a block configuration of an image processing unit according to an embodiment.

The image processing unit 2 has a well-known block configuration as shown in FIG. 4. Specifically, the image processing unit 2 includes a CPU 20 such as a microprocessor. The CPU 20 is connected with a ROM 21, an image processor 22, a camera interface 23, a monitor interface 24, an input/output (I/O) device 25, a frame memory (image memory) 26, a nonvolatile memory 27, a RAM 28 and a communication interface 29 through a bus line 50.

The camera interface 23 is connected with a camera (the camera 4, as shown in FIG. 2) as an image capturing means. Upon receipt of an image capturing instruction through the camera interface 23, the process of picking up an image is performed through the electronic shutter function set in the camera 4, and an image signal thereof is stored in the frame memory 26 in the form of a gray scale signal through the camera interface 23. The monitor interface 24 is connected with a monitor (the monitor 3 as shown in FIG. 2) to display, as required, the image being picked up by the camera, the past image stored in the frame memory 26 and the image processed by the image processor 22.

Returning to FIG. 2, according to this embodiment, the relative positions of the tool mounting surface 32 and the tool center point 31 of the robot 1 are measured. As described above, the position and posture of the tool mounting surface 32 can be represented by the mechanical interface coordinate system $\Sigma f$ fixed on the tool mounting surface 32. Determining the position of the tool center point 31 with respect to the tool mounting surface 32, therefore, is equivalent to determining the tool center point 31 on the mechanical interface coordinate system $\Sigma f$. Similarly, when determining the "position and posture" of the tool center point 31 with respect to the tool mounting surface 32, it is sufficient to determine by determining the position and posture of the tool center point 31 on the mechanical interface coordinate system $\Sigma f$.

The target corresponding to the tool center point 31 may be a geometric feature point of the tool 30 itself or a reference mark for position measurement attached to the center point 31 of the tool 30. In any way, as described in detail later, the image of the tool center point 31 is picked up within the visual field by the camera 4, and the image thus obtained is analyzed in the image processing unit 2. The image signal of the image containing the tool center point 31 stored in the frame memory 26 is analyzed by the image processor 22 thereby to determine the three-dimensional position thereof (as described in detail later). The program and parameters for this purpose are stored in the nonvolatile memory 27. The RAM 28 is used to temporarily store the data required for various processes executed by the CPU 20. The communication interface 29 is connected to the robot control unit through the communication interface 14 on the robot control unit side described above.

The view line of the camera 4 is shown in FIG. 2. This view line 40 is a straight line directed from the representative point of the camera 4 (center of the light receiving surface, for example) toward the tool center point 31. The coordinate system $\Sigma v$ associated with the view line 40 is described. Specifically, the coordinate system $\Sigma v$ represents the view line 40 directed from a representative point of the camera 4 (center of the light-receiving surface, for example) toward the tool center point 31, and has the origin on the view line 40. In this coordinate system, one coordinate axis (Z axis, for example) is assumed to coincide with the view line 40. Also, as described above, the coordinate system $\Sigma b$ is the robot coordinate system fixed on the robot base, and the coordinate system $\Sigma f$ is the mechanical interface coordinate system of the robot.

The mechanical interface coordinate system $\Sigma f$, which represents the position and posture of the tool mounting surface 32 as described above, is employed also as "a coordinate system representing the position and posture of the robot 1" at the same time. Specifically, unless otherwise specified, the "robot position" is defined as the "position of the origin of the mechanical interface coordinate system $\Sigma f$ on the robot coordinate system $\Sigma b$", and in the case taking also the posture into consideration, the "position and posture of the origin of the mechanical interface coordinate system $\Sigma f$ on the robot coordinate system $\Sigma b$".

In this configuration, the light-receiving device is a CCD camera to capture a two-dimensional image. As an alternative, the light-receiving device may be another device (CMOS camera, etc.) having an equivalent function, or in the case where the tool center point 31 is regarded as a spot light source, a PSD to determine the center of gravity (two-dimensional position) of the received light quantity. In the case where such an alternative configuration is employed, however, the image processing unit 2 is of course replaced with an appropriate device depending on the alternative light-receiving device. In the case where the two-dimensional PSD is employed, for example, a processing unit is used which has the function to process the output signal of the PSD and to determine the position of the center of gravity (two-dimensional position) of the received light quantity.

Figure 10:
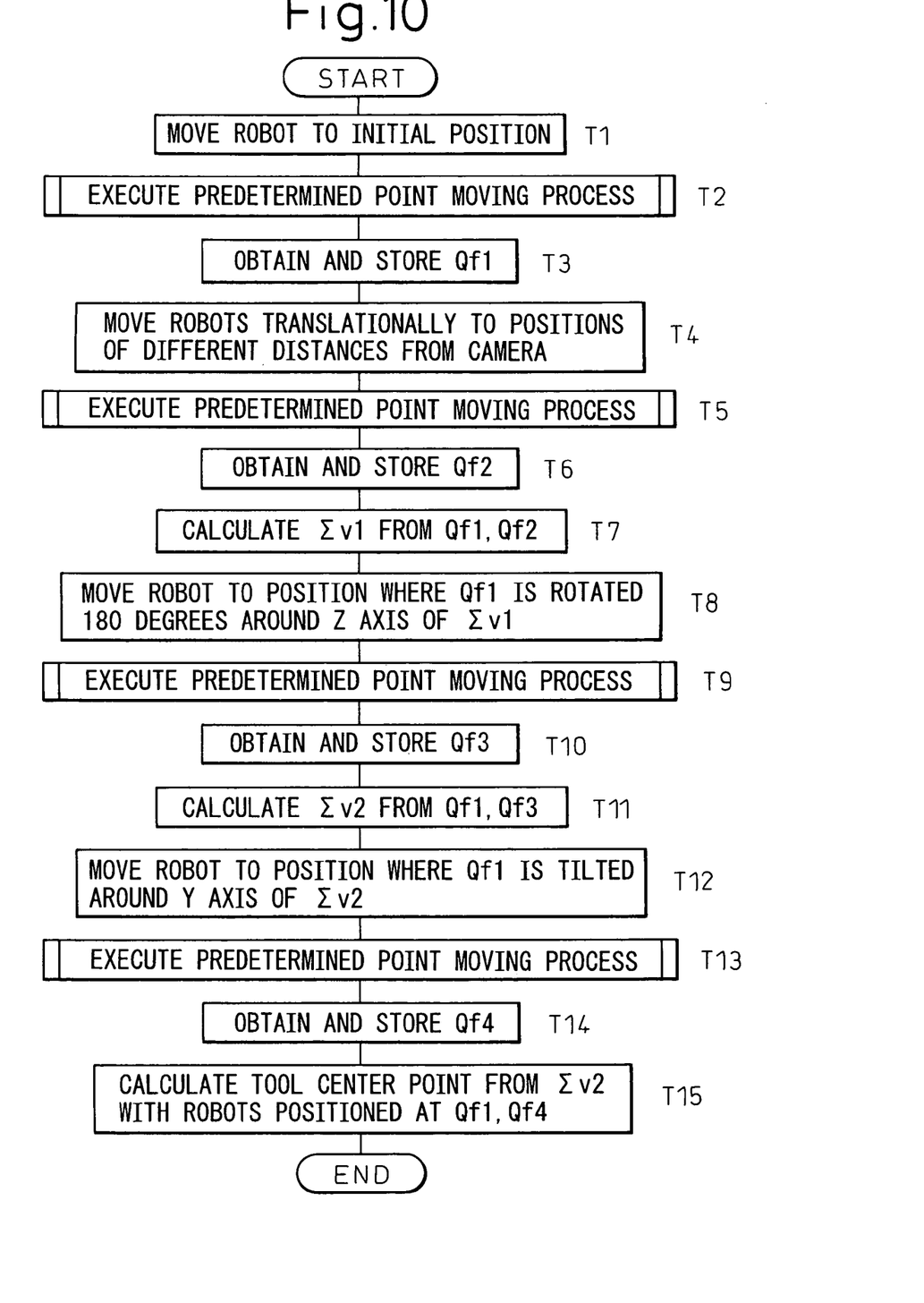
FIG. 10 is a flowchart briefly describing the whole process executed according to this embodiment.

An example of the procedure for determining the position of the tool center point 31 according to the technical concept of this invention is explained below, and the light-receiving device is described as a camera (CCD camera) connected to the image processing unit 2. Needless to say, the camera may of course be appropriately replaced with another light-receiving device and an appropriate signal processing unit. An outline of the whole process executed according to this embodiment is shown in the flowchart of FIG. 10. The following explanation is made in line with this flowchart. In the description that follows, "the position (or the position and posture in some cases) of the tool center point 31 with respect to the tool mounting surface 32 (represented by the mechanical interface coordinate system Σf)" is appropriately abbreviated as "the relative position (the relative position and the relative posture in some cases) of the tool center point 31".

[Steps T1, T2]

With the configuration described above, the relative position (the relative position and the relative posture in some cases) of the tool center point 31 is determined based on "the determination of the view line 40". Generally, the view line is determined by what is called the camera calibration. In this invention, however, such a method is not required. Specifically, in order to acquire the information on the view line 40 without using conventional method of camera calibration, the basic idea is employed to move the robot so that the position of the tool center point 31 on the light-receiving surface is moved toward (reaches) a predetermined point on the light-receiving surface. The term "a predetermined point on the light-receiving surface" is specifically predefined as "a predetermined point" such as "the center point of the light-receiving surface (geometric position of the center of gravity)". Therefore, this process is hereinafter called "the predetermined point moving process".

First at step T1, the robot 1 is moved to the appropriate initial position (the robot is set at the initial position) where the camera 4 can grasp the tool center point 31 in the visual field. Next, the predetermined point moving process (step T2) is executed as described below. Specifically, the tool 30 is moved (by moving the robot) in such a direction that the tool center point 31 grasped by the light-receiving device (camera, PSD, etc.) is directed toward "a predetermined point on the light-receiving surface" and, in this way, the process is executed whereby the tool center point 31 actually comes to coincide with the predetermined point within a predetermined error on the light-receiving surface.

Figure 5:
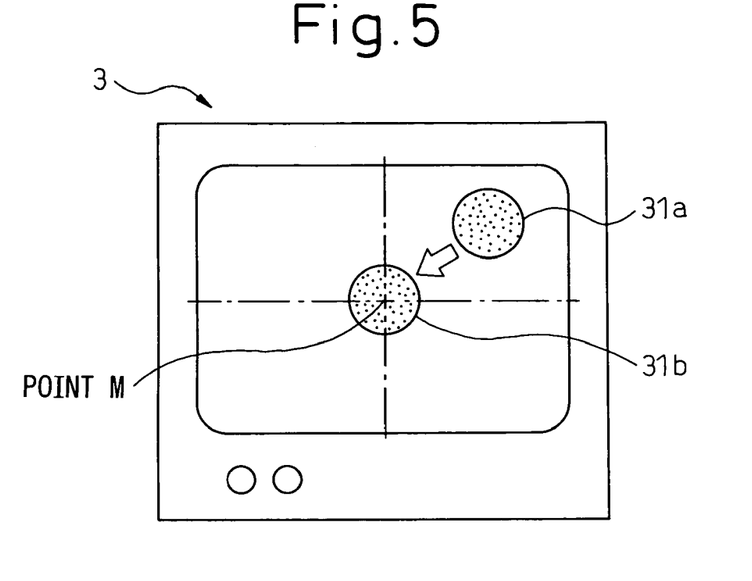
FIG. 5 is a diagram showing the manner in which the tool center point is moved to the center of the light-receiving surface of a light-receiving device on the monitor screen.

The "center point of the light-receiving surface (CCD array)" is employed as the "predetermined point on the light-receiving surface". FIG. 5 shows the manner, on the monitor screen, in which the tool center point 31 is moved to the center point of the light-receiving surface. In FIG. 5, the screen of the monitor 3 is set in such a manner that the point M corresponds to the center of the light-receiving surface of the camera 4. If the robot 1 set at an appropriate initial position, the image 31a of the tool center point 31 is displayed at the shown position.

In this case, the robot 1 is moved in such a direction that the image 31a moves to a lower left direction diagonally toward the point M on the screen. Before starting the series of process, however, the relative positions of the robot 1 and the camera 4 are not known at all, and therefore the direction in which the robot 1 is to be moved cannot be determined from the relative positions on the screen. In order to move the image 31a of the tool center point in the desired direction (toward the point M in this case), it is necessary first of all to determine the manner in which to move the robot 1 in the space.

This is comparatively simple. Specifically, the robot 1 is moved in several (plural) arbitrary directions in the XY plane of the mechanical interface coordinate system Σf in FIG. 2, for example, and the direction in which the image 31a of the tool center point moves on the image is observed. In this way, the process is executed to determine the relation between the direction in which the robot 1 moves and the direction in which the tool center point moves on the image, and the relation between the movement covered by the robot and the movement covered by the tool center point on the image.

Figure 9:
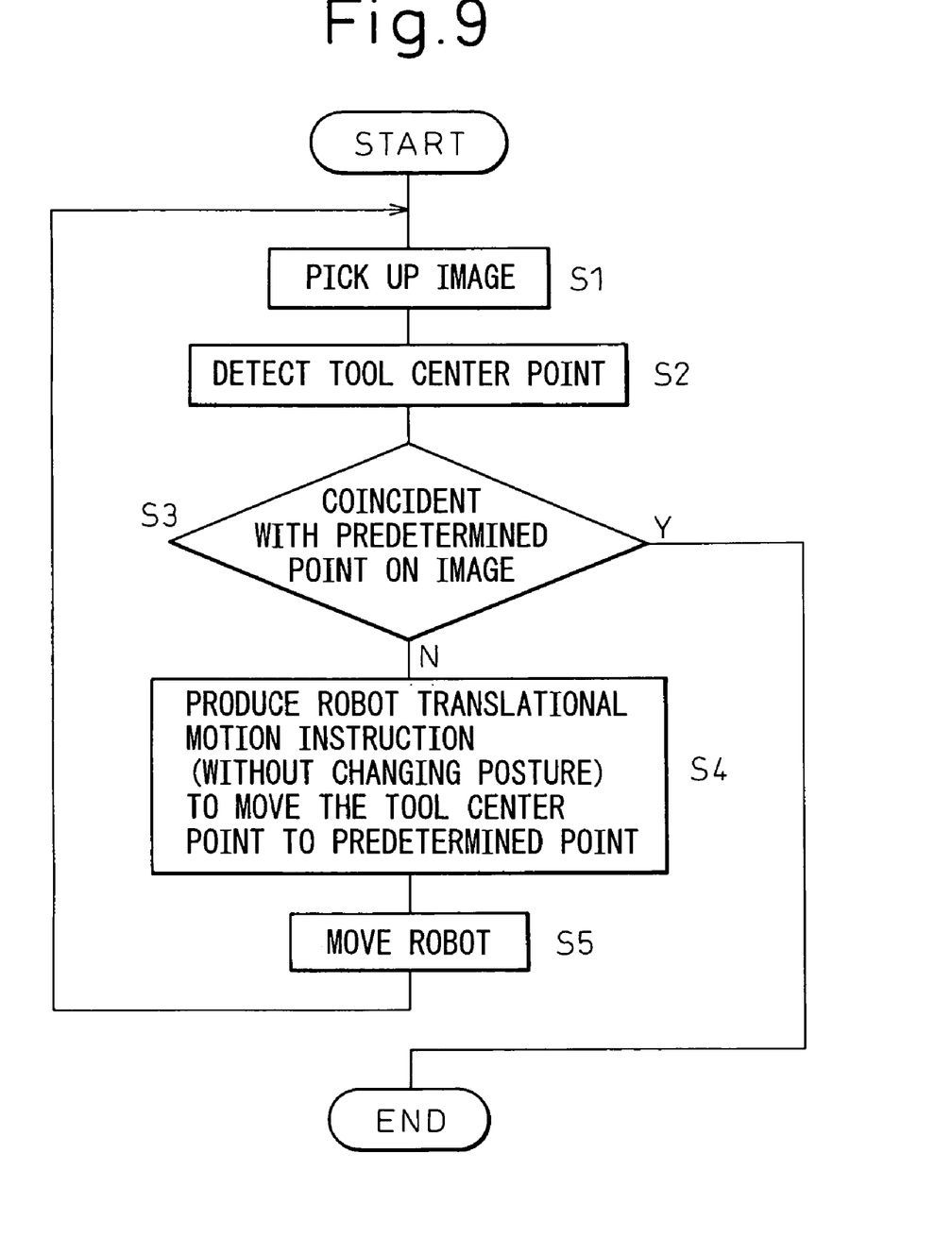
FIG. 9 is a flowchart briefly describing the process of moving to a predetermined point.

This method of determining the direction of movement and the ratio of the covered distance is well known and therefore not described in detail. Also, the description that follows assumes the above process is already done. A specific example of the process to attain coincidence the tool center point (image 31a) of which the image is picked up by the camera 4 with the predetermined point M on the image is shown in the flowchart of FIG. 9. The process executed at each step is briefly described below.

Step S1: The image of the tool center point 31 is picked up. As a result, the image 31a shown in FIG. 5, for example, is obtained.

Step S2: The position of the tool center point 31 on the image (the position of the image 31a on the image as shown in FIG. 5, for example) is obtained in the image processing unit 2.

Step S3: This step determines whether the position determined at step S2 is coincident with a predetermined point (the point M in this case) on the image. Assume, for example, that a threshold distance δimage on the image is set in advance. If the distance between the point M and the image 31a is not longer than the threshold distance δimage, the "coincidence" is determined and the process is ended. On the other hand, if the distance between the point M and the image 31a is longer than the threshold distance δimage, a "lack of coincidence" is determined, and the process proceeds to step S4. Incidentally, the distance on the image can be measured by, for example, the number of square "pixels" involved.

Step S4: A robot translational motion instruction is produced to move the tool center point (image 31a) to the predetermined point M. The robot translational motion instruction is the movement instruction to move the robot in such a manner as to maintain a predetermined posture of the robot, i.e. a predetermine posture of the coordinate system Σf on the robot coordinate system Σb (fixed in the space).

Step S5: Based on the robot translational motion instruction produced at step S4, the robot 1 is moved. Upon complete movement, the process is returned to step S1. In similar fashion, this process is repeated until step S3 determines the "coincidence".

[Step T3]

The "predetermined point moving process" is described above. Upon completion of the process, i.e. once the robot is completely moved to the position where the image of the tool center point designated by reference numeral 31b is obtained at the image center M by the predetermined point moving process from the initial robot position where the image of the tool center point designated by reference numeral 31a is displayed in FIG. 5, then the position Qf1 of the coordinate system Σf on the robot coordinate system Σb is obtained and stored.

[Step T4]

Figure 6:
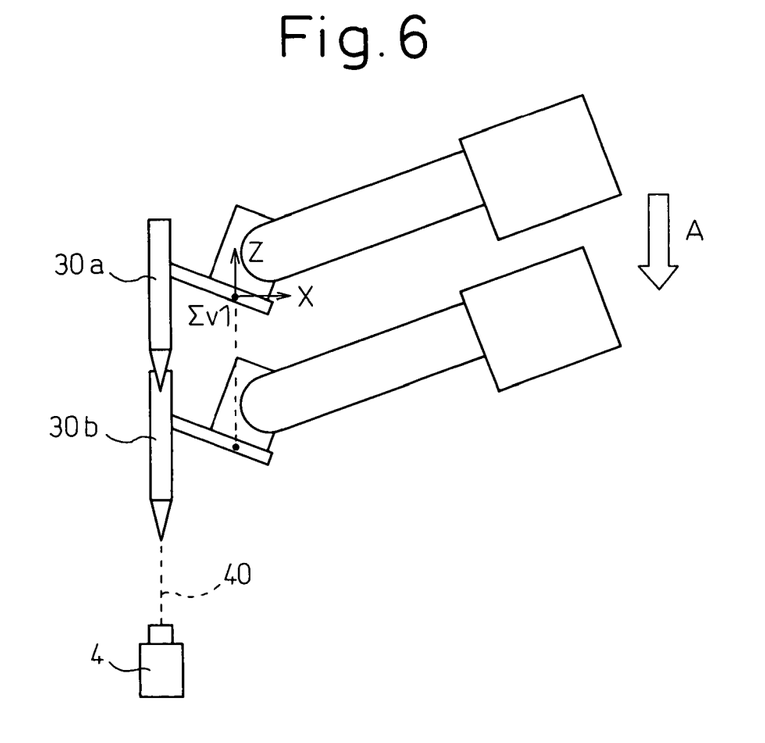
FIG. 6 is a diagram for explaining the process of step T4.

Next, the process to determine the direction of the view line 40 is executed. As long as the image of the tool center point is focused at the center of the image, the view line 40 is a straight line connecting the point M on the light-receiving surface of the camera corresponding to the center of the image and the tool center point 31. At this step, the direction in which the straight line is arranged on the mechanical interface coordinate system $\Sigma f$ of the robot is determined. For this purpose, first, the robot 1 is moved translationally by the process of step T4. FIG. 6 is a diagram for explaining this process. In FIG. 6, the coordinate system $\Sigma v1$ is assumed to determine the direction of the view line 40 and assumed to satisfy the following conditions.

(I) The coordinate system $\Sigma f$ and the coordinate system $\Sigma v1$ have the same origin.

(II) The Z axis of the coordinate system $\Sigma v1$ is coincident with the direction of the view line 40.

The direction of Z axis of the coordinate system $\Sigma v1$ on the coordinate system $\Sigma f$ is determined at the time of completion of the predetermined point moving process. More specifically, the component (W, P) of the Euler's angle (W, P, R) indicating the posture of the coordinate system $\Sigma v1$ on the coordinate system $\Sigma f$ is determined.

For this purpose, first, the translational motion is executed at step T4. In the-motion, the robot is moved (see arrow A) translationally to a position where the distance between the tool center point 31 and the camera is different from the initial difference without changing the tool posture. In FIG. 6, numeral references 30a, 30b designate the tool before and after movement, respectively.

[Steps T5, T6]

Generally, after translational motion at step T4, the image of the tool center point 31 is displaced out of the center M of the image (center of the light-receiving surface) again. Thus, the predetermined point moving process is executed again (step T5). In the predetermined point moving process, as described at step T2, the image of the tool center point 31 is returned to the position within the error range from the image center (center of the light-receiving surface) M again. Upon completion of step T5, the position Qf2 of the coordinate system $\Sigma f$ on the robot coordinate system $\Sigma b$ is obtained and stored (step T6).

[Step T7]

The straight line connecting the position Qf1 obtained at step T3 and the position Q2 obtained at step T6 indicates the direction of the view line 40. If the relative covered movement from Qf1 to Qf2, as viewed on the coordinate system $\Sigma f$ before the robot movement at step T4 is dX, dY, dZ, the Euler's angle (W, P, R) indicating the posture of the coordinate system $\Sigma v1$ on the coordinate system $\Sigma f$ is calculated as below. The coordinate system $\Sigma v1$ is thus determined and the Z axis of this coordinate system indicates the direction of the view line 40.

$$W = \tan^{-1}\left(\frac{-dY}{\sqrt{(dX)^2 + (dZ)^2}}\right) \quad (1)$$

$$P = \tan^{-1}\left(\frac{dX}{dZ}\right)$$

$$R = 0$$

[Steps T8, T9, T10, T11]

Figure 7A:
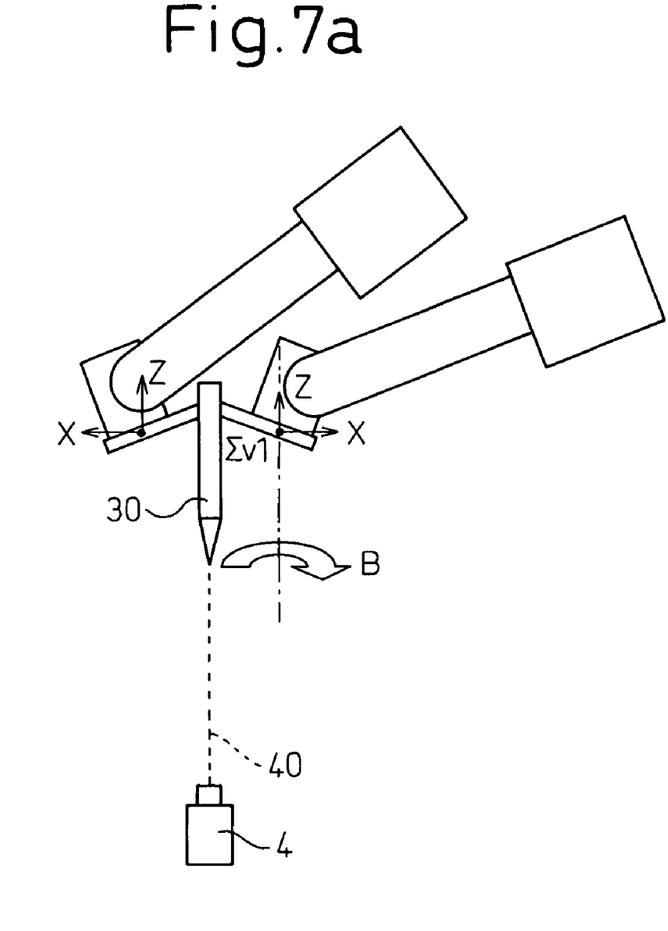
FIG. 7a is a diagram for explaining the process of step T8 and shows the manner in which the coordinate system $\Sigma v1$ is moved by rotation.
Figure 7B:
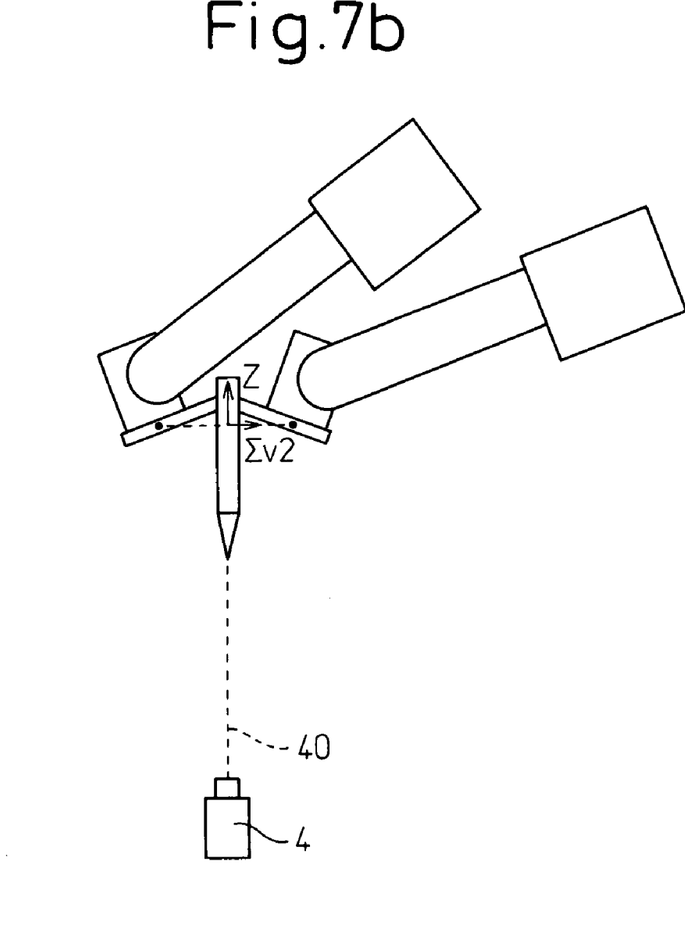
FIG. 7b is a diagram for explaining the process of step T8 and shows the relation between the rotational movement and the position of the coordinate system $\Sigma v2$.

After determining the direction of the view line 40 at step T7, the process proceeds to the step of determining the position of the view line 40. FIGS. 7a, 7b are diagrams for explaining this process. In FIG. 7b, the coordinate system $\Sigma v2$ indicates the position and direction of the view line 40, corresponds to the coordinate system $\Sigma v$ in FIG. 2 and satisfies the following conditions.

(III) The coordinate system $\Sigma v2$ has the origin on the view line 40.

(IV) The Z axis of the coordinate system $\Sigma v2$ coincides with the direction of the view line 40.

The direction of the view line 40 is already determined as Z axis of the coordinate system $\Sigma v1$ (FIG. 7a) and the Z axis of the coordinate system $\Sigma v2$ is in the same direction as the Z axis of the coordinate system $\Sigma v1$. To determine the position of the origin, the robot is moved to the position in which Qf1 is rotated by 180 degrees around Z axis of the coordinate system $\Sigma v1$ (step T8), and then the predetermined point moving process is executed again (step T9). FIG. 7a shows the state of the rotational movement (see arrow B) and the state in which the movement by the predetermined point moving process are completed, and FIG. 7b shows the position of the origin of the coordinate system $\Sigma v2$. The position of the origin of the coordinate system $\Sigma v2$ is given as the midpoint of the coordinate system $\Sigma f$ before and after the rotational movement.

After complete rotational movement, the robot position Qf3 is obtained and stored (step T10). Then, the midpoint between Qf1 and Qf3 is determined as the origin of the coordinate system $\Sigma v2$.

The relative covered movement from Qf1 to Qf3 as viewed on the coordinate system $\Sigma f$ before the robot movement at step T8 is assumed to be dX, dY, dZ respectively, and the origin (X, Y, Z) of the coordinate system $\Sigma v2$ as viewed on the coordinate system $\Sigma f$ is determined from the below equations. The posture of the coordinate system $\Sigma v2$ is identical with that of the coordinate system $\Sigma f1$, and therefore the position and posture of the coordinate system $\Sigma v2$ as viewed on the coordinate system $\Sigma f$ before the robot movement at step T8 can be determined (step T11). The matrix indicating this is hereinafter expressed as V.

$$X = dX/2$$

$$Y = dY/2$$

$$Z = dZ/2 \quad (2)$$

[Steps T12, T13, T14, T15]

Figure 8:
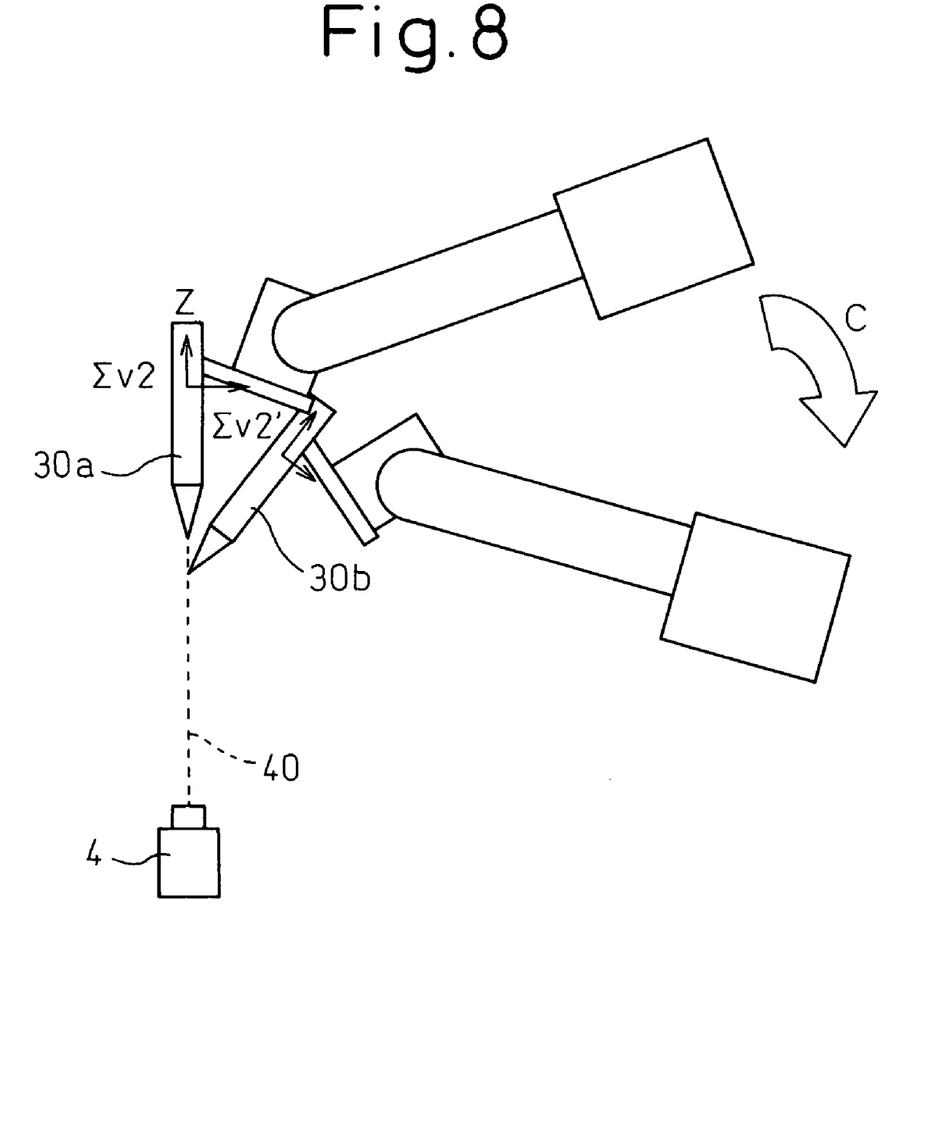
FIG. 8 is a diagram for explaining the process of determining the position of the tool center point.

Finally, the process of determining the position of the tool center point is executed using the position and posture of the view line 40. FIG. 8 is a diagram for explaining this process. The robot is tilted and moved to the position where Qf1 is tilted around the Y axis of the coordinate system $\Sigma v2$ (step T12). Then, the predetermined point moving process is executed again (step T13). FIG. 8 shows the state including the tool 30b after completion of this process (the coordinate system $\Sigma v2$ is moved to the coordinate system $\Sigma v2'$). Incidentally, the tool 30a assumes the state of the tool before being tilted and moved. After completion of step T13, the robot position Qf4 is obtained (step T14) and stored.

The coordinate system $\Sigma v2$ as viewed from the coordinate system $\Sigma f$ when the robot is positioned at position Qf1 is represented as V, and the coordinate system $\Sigma v2'$ when the robot is positioned at position Qf4 is given as $$Qf1^{-1} \cdot Qf4 \cdot V$$

By determining the intersection between the Z axes of the two coordinate systems, the position of the tool center point can be determined for the robot position Qf1 (step T15).

Incidentally, the procedure described above represents only an example and modifications such as those shown below is possible.

(a) At step T8 (FIG. 7), the robot is moved to the position where Qf1 is rotated by 180 degrees around the Z axis of the coordinate system Σv1. However, the angle of rotation is not necessarily 180 degrees, and as long as the rotation around the Z axis is included, a composite movement including other posture change is also acceptable.

(b) At step T12 (FIG. 8), the robot is moved to the position where Qf1 is titled around the Y axis of the coordinate system Σv2. However, the tilting operation is not necessarily around Y axis, and as long as the rotation around the direction perpendicular to Z axis is included, a composite movement including other posture changes is also acceptable.

Figure 11A:
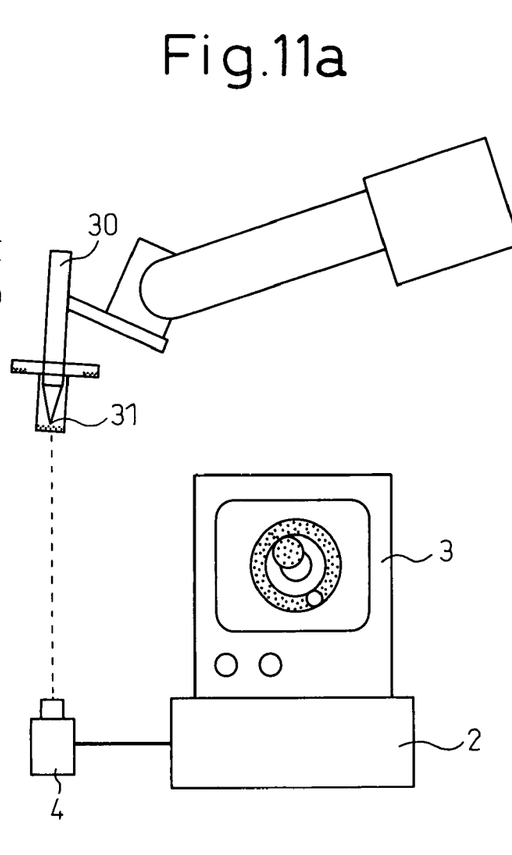
FIG. 11a is a diagram for explaining a method of determining the tool posture by additional measurement and shows the arrangement and the manner in which the image is displayed on the monitor screen at the time of additional measurement.
Figure 11B:
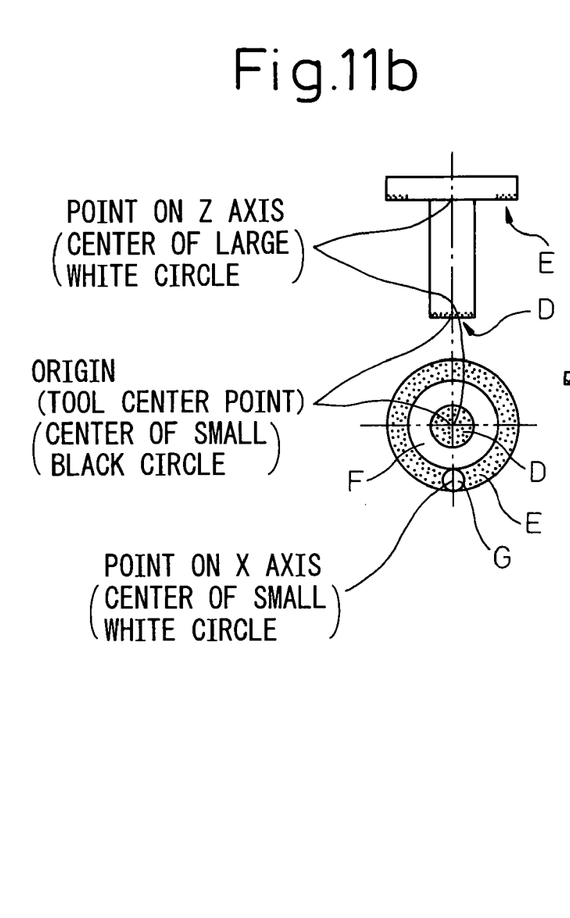
FIG. 11b is a diagram for explaining a method of determining the tool posture by additional measurement and shows the point of additional measurement using the image displayed on the monitor screen.

Further, by additionally measuring two positions of which the relative positions from the tool center point are known, the tool posture as well as the position of the tool center point can be determined. FIG. 11 is a diagram for explaining the method of determining the tool posture by this additional measurement. FIG. 11a shows the arrangement for the additional measurement and the manner in which the image is displayed on the monitor screen, and FIG. 11b is a diagram for explaining the points additionally measured using the image displayed on the monitor screen. As shown in FIG. 11a, the robot is rendered to assume the posture in which the longitudinal direction of the tool 30 is substantially along the view line of the camera 4 and the tool center point 31 is directed toward the camera 4. An image capturing instruction is sent from the image processing unit 2 and the camera 4 picks up an image, which is displayed on the screen of the monitor 3.

According to this embodiment, a circular mark (small black circle) D is drawn to the forward end of the tool 30, and an annular mark (large black ring) E is drawn to the base of the tool 30. The annular mark E partly includes a small while circle G. Also, the inner periphery of the large black ring forms "a large white circle F", while the small black circle D is drawn with the center thereof coincident with the tool center point 31. The black circle D, the black ring E and the white circle G etc. are not necessarily so colored, but may be of colors different each other on gray scale. In FIGS. 11a, 11b, the black circle and the black ring are represented by hatching. The plane containing "the large white circle F" and the plane containing "the small black circle D" are parallel to each other. At the same time, the straight line passed through the center of "the large while circle F" in the direction perpendicular to the plane containing "the large white circle F" is also passed through the center of "the small black circle D" (tool center point 31). Instead of drawing the pattern of the marks satisfying these conditions on the tool 30, a cap member (with the pattern of marks drawn thereon) may be prepared and fitted onto the tool 30, so that the pattern of similar marks is presented by the cap fitted onto the tool 30.

Once this pattern is prepared, "the center of the small while circle G" and "the center of the large white circle F" can be selected as additional measurement points. This corresponds to a case in which a coordinate system (the coordinate system representing the position and posture of the tool center point, hereinafter referred to as the tool coordinate system) whose origin is the tool center point 31 (center of the small black circle) is assumed in which a point on X axis thereof is selected as "the center of the small white circle G" and a point on Z axis thereof as "the center of the large white circle F".

By determining the relative positions (positions on the mechanical interface coordinate system) of "the center of the small white circle G" and "the center of the large white circle F", therefore, the relative posture of the tool coordinate system can be calculated because the relative position of the tool center point 31 is already measured. As for the calculation methods, a plurality of similar calculation methods are known and therefore not described herein. Also, the additional two points can be measured by a method similar to the method of measuring the position of the tool center point (described above).

The data on the relative positions of "the center of the small white circle G" and "the center of the large white circle F" are combined with the known relative positions of the tool center point 31. Then, a matrix is determined which indicates the position and posture of the tool coordinate system with respect to the mechanical interface coordinate system.

Incidentally, the camera may be arranged at an arbitrary position around the robot at the time of measurement, and removed after measurement. In such a case, even in the case where the relative positions of the robot and the camera are changed and the measurement becomes impossible, a measurable state can be easily restored.

Although the invention has been shown and described with exemplary embodiments thereof, it should be understood by those skilled in the art that the foregoing and various other changes, omissions and additions may be made therein and thereto without departing from the spirit and the scope of the invention.

What is claimed is:

1. A measuring system comprising:
    a robot with a tool mounted at the forward end of an arm thereof;
    a light-receiving device;
    a means to set the robot in an initial position;
    a means in which the center point of the tool mounted at the forward end of the arm of the robot is caught by the light-receiving device thereby to determine the position, on a light-receiving surface of the light-receiving device, of the tool center point with the image thereof focused on the light-receiving surface;
    a means to determine the movement to be covered by the robot in such a manner that the position of the tool center point on the light-receiving surface is moved to a predetermined point on the light-receiving surface;
    a means to move the robot by the determined movement to be covered;
    a means to obtain and store the position of the robot after the robot is moved; and
    a means in which, in the presence of a plurality of initial positions, the position of the tool center point with respect to the tool mounting surface of the robot is determined using the position of the robot moved and stored for each initial position, while the position of the light-receiving device is fixed.

2. A measuring system according to claim 1, further comprising:
    a coincidence determining means to determine that the position of the tool center point in the image thereof focused on the light-receiving surface of the light-receiving device is coincident with a predetermined point on the light-receiving surface within a predetermined error after the movement but before obtaining and storing the position of the robot.

3. A measuring system according to claim 2, further comprising:

a means to set the said position of the robot as the initial position again in the case where the coincidence determining means fails to determine the coincidence within the predetermined error.

4. A measuring system according to claim 1, further comprising:

a means to determine the direction of the view line of the light-receiving device with respect to the robot coordinate system using at least two positions of the robot, the positions having the same tool posture and different distances between the tool and the light-receiving device each other.

5. A measuring system according to claim 4, further comprising:

a means to determine the position of the view line of the light-receiving device with respect to the robot coordinate system using at least two positions of the robot, the positions having different tool postures including the rotation around an axis parallel to the direction of the view line, based on the determined direction of the view line of the light-receiving device with respect to the robot coordinate system.

6. A measuring system according to claim 5, further comprising:

a means to determine the position of the tool center point with respect to the tool mounting surface of the robot using at least two positions of the robot, the positions having different tool postures including the rotation around an axis perpendicular to the direction of the view line, based on the determined position and direction of the view line of the light-receiving device with respect to the robot coordinate system.

7. A measuring system according to claim 1,
wherein the light-receiving device is arranged at an arbitrary position around the robot at the time of measurement and removed after the measurement.

8. A measuring system according to claim 1,
wherein the light-receiving device is a camera to capture a two-dimensional image.

9. A measuring system according to any claim 1,
wherein the light-receiving device is a PSD to determine the center of gravity of the distribution of the received light quantity.

10. A measuring system according to claim 6, further comprising:

a means to determine the position and posture of the tool center point with respect to the tool mounting surface of the robot by additionally measuring one or two points on the tool in a predetermined positional relation with the tool center point.

* * * * *